Walter O. Wilkening

Feb. 21, 1956

W. O. WILKENING 2,735,425

ANTINEGATIVE G VALVE MECHANISM

Filed Jan. 11, 1954

Inventor
WALTER O. WILKENING
By Bair, Freeman & Molinare
Attorneys

Feb. 21, 1956  W. O. WILKENING  2,735,425
ANTINEGATIVE G VALVE MECHANISM
Filed Jan. 11, 1954  3 Sheets-Sheet 3

Inventor
WALTER O. WILKENING
By Bair, Freeman & Molinare
Attorneys

United States Patent Office 2,735,425
Patented Feb. 21, 1956

2,735,425

ANTINEGATIVE G VALVE MECHANISM

Walter O. Wilkening, Bryan, Ohio, assignor to The Aro Equipment Corporation, Bryan, Ohio, a corporation of Ohio Application January 11, 1954, Serial No. 403,411

7 Claims. (Cl. 128—142)

The present invention relates to an improved mechanism to regulate the admission of air under pressure to the helmet of an aviator to compensate for negative G acceleration without interfering with normal respiration.

When high speed aircraft execute maneuvers tending to throw the aviator upward from his operating seat, the negative gravity or negative "G" forces tend to drive body fluids, especially the blood, from the lower extremities of the aviator to his head. This hampers the ability of the aviator to control the plane under modest degrees of acceleration and, when the negative G acceleration is intense, can cause loss of ability to control the plane and physical damage to the aviator.

In the apparatus described herein, these deleterious results of negative G acceleration are overcome by supplying air at a predetermined high pressure to the helmet during periods of negative G acceleration. The pressure of the air thus supplied is regulated in accord with the negative G acceleration so that the head of the aviator is exposed to a counterpressure substantially equal to and in proportion to the negative G forces tending to drive body fluids to his head. At a negative G acceleration short of that which initiates admission of air under pressure to the helmet, the flow of oxygen to the helmet is interrupted by a weight actuated valve provided for the purpose.

When the period of negative G acceleration has passed, the valve to the pressurized source closes and the valve to the oxygen source opens. However, the aviator does not immediately receive oxygen because of a check valve provided to prevent contamination of the oxygen supply by the air under pressure from the helmet. The helmet air pressure is relieved under these conditions by a pressure balance valve having a pair of opposed pressure receiving faces, one exposed to the gas pressure on one side of the check valve and the other exposed to the gas pressure on the other side of the check valve. The pressure balance valve opens when the pressure is of direction to drive air from the helmet into the oxygen supply, in other words, when the check valve is closed. The balanced pressure valve in the open position defines a passage to the atmosphere so as to relieve the excess pressure in the helmet until that pressure falls to the oxygen supply pressure. The check valve then opens and closes as the aviator breathes to supply the oxygen demand of the aviator.

It is, therefore, a general object of the present invention to provide an improved mechanism to apply air under pressure to the helmet of an aviator in response to negative G.

A more particular object is to provide an improved mechanism wherein pressure built up during periods of negative G acceleration is relieved without contaminating the lower-pressure oxygen supply.

Still another object of the present invention is to provide an improved control valve to supply pressure to the helmet of an aviator during negative G acceleration and using a balanced pressure valve to discharge excess pressure without interfering with respiration and without contaminating the oxygen supply.

It is yet another object of the present invention to provide an integrated oxygen supply and anti-negative G valve capable of maintaining the comfort, safety, and craft handling ability of an aviator under negative G accelerations while at the same time promptly and safely relieving the high helmet pressure as the negative G acceleration falls.

The novel features which I believe to be characteristic of my invention are set forth with particularity in the appended claims. My invention itself, both as to its organization and method of operation, together with further objects and advantages thereof, may best be understood by reference to the following description taken in connection with the accompanying drawings, in which:

Figure 5:
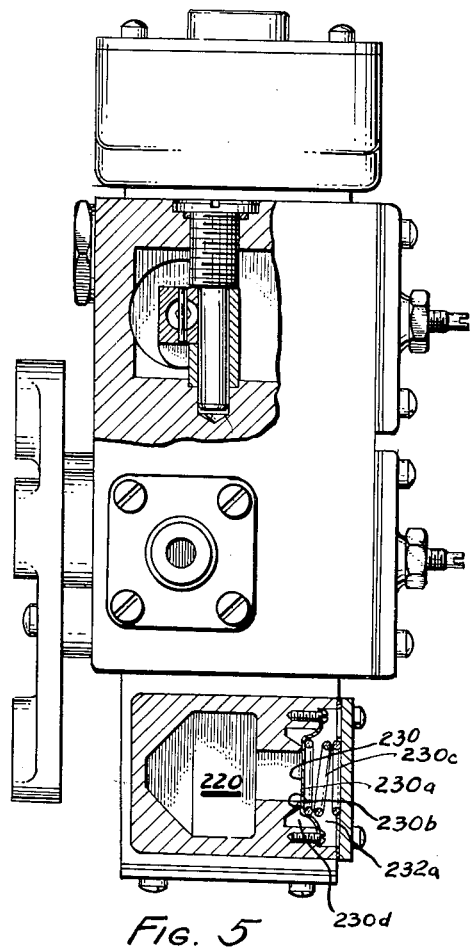
Figure 5 is a side elevational view with parts in cross-section of an alternative embodiment of the present invention.
Figure 6:
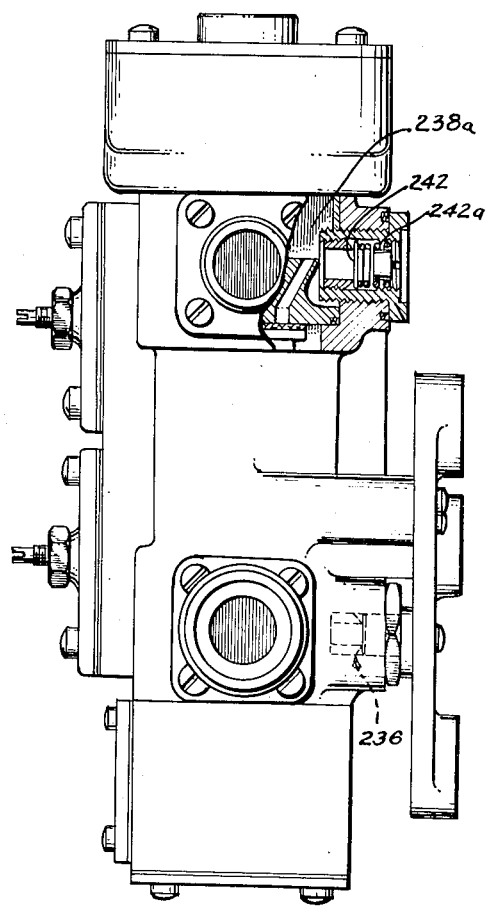
Figure 6 is a view of the apparatus of Figure 5 from the opposite side and with parts broken away.
Figures 7, 8:
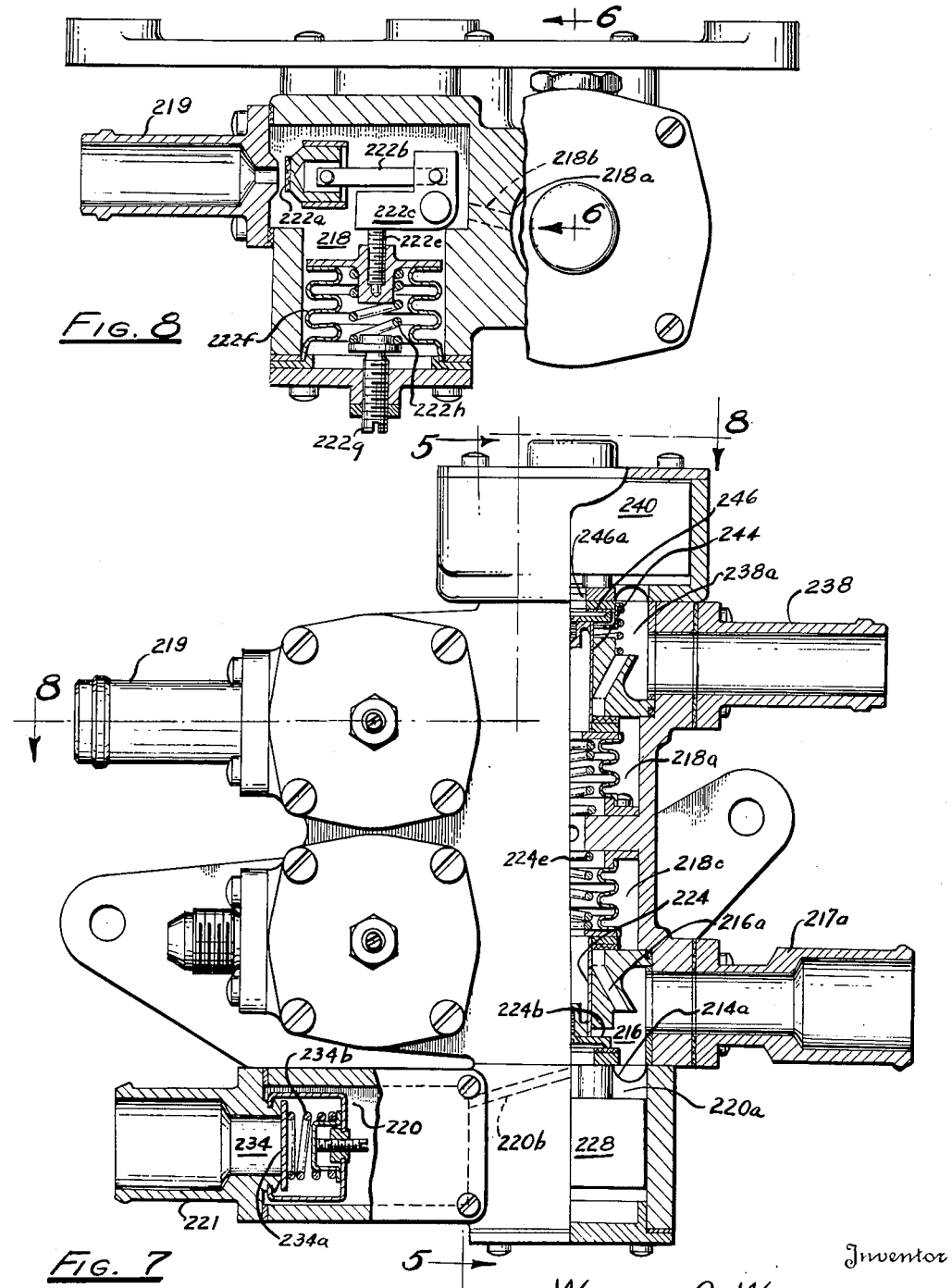

Figure 7 is an end elevational view of the apparatus of Figures 5 and 6, likewise with parts broken away to show the internal structure, the parts in cross-section in Figure 5 being taken on the line 5—5 of Fig. 7; and Figure 8 is a cross-sectional view through axis 8—8, Figure 7.

Referring now to Figures 1–4, the apparatus consists of a housing 10, which may be cast or of fabricated construction having top and bottom walls 10a and 10b, respectively, side walls 10c and 10d, and front and back walls, the former being not shown and the latter being indicated at 10e. The housing is partitioned by walls 12 and 14 to define three chambers or spaces. One of these chambers, 16, communicates with the aviator's helmet through the pipe 110c, which extends outwardly through the wall 10c. Another chamber, 18, communicates with a source 19 of air under high pressure, say 50 to 500 pounds per square inch, through the valve-controlled port 110d formed in the wall 10d. The third chamber, 20, communicates with a source of oxygen 21 through the pipe 110e which extends through the wall 10d as shown.

The air pressure within the space 18 is regulated by the valve indicated generally at 22. Briefly, this unit consists of a beveled seating member 22a, which seats on the inner annular beveled margin of the port-defining pipe 110d. A stem 22b integral with this seating member is guided by suitable means (not shown) and is pinned at its free end to the crank 22c, which is pivotally supported at 22d. The other crank arm is pinned to the downwardly extending arm 22e on the bellows 22f. The bellows 22f is adjustably supported from the top 10a of the housing by the stud 22g, which is threadedly received therein.

The valve 22 acts to admit air into the chamber 18 as the pressure therein falls. Such pressure drop gives rise to an expansion of the bellows 22f, thus moving arm 22e down and valve stem 22b to the left. This admits air from the high pressure source 19, thereby increasing the pressure in chamber 18 until the bellows compress and the valve 22a again closes. This feedback action regulates the pressure in the chamber or space 18 to a preset value determined by the adjustment of the stud 22g, the regulated pressure increasing as the stud is moved downwardly. In an actual valve unit the regulated pressure in chamber 18 might be 12–14 pounds per square inch, or about twice sea-level atmospheric pressure.

Chamber 20 receives oxygen from source 21 and at the pressure of that source, which may, for example be about sea-level atmospheric pressure.

The negative G control valve unit is indicated generally at 24. This unit consists of a stem 24a, which is slideably supported by the bushing 26a of the wall 26, and at its bottom end forms a cup-shaped seating member 24b adjacent wall 14. The top end of the stem 24a is affixed to the upper face 24c of the bellows 24d as shown, so that the stem moves vertically up and down as the bellows expand and contract with variations in air pressure within chamber 18. The wall 26 has a series of ports 26b, through which air can flow from the space 18 to the interior of the bellows 24d. The stem 24a and the bellows 24d are biased downwardly by the compression spring 24e which seats against the plate 24f, which is affixed to the end of the threaded stud 24g, which controls the spring pressure. The stem 24a further carries the annular valve seating member 24h, which seats on the lip formed by the tube 12a, which encircles the stem 24a and is mounted in wall 12.

The stem 24 is pushed upwardly by the actuating weight 28, which is attached to the apertured diaphragm 14a of the wall 14 by the posts 28a.

Under non-accelerating conditions, when the downward force of the weight 28 is only its normal weight, the diaphragm 14a sustains weight 28 and defines a space with respect to the valve member 24b, through which oxygen can flow from chamber 20 to the chamber 16. At this time the downward motion of the stem 24 is limited by the seating engagement of the valve member 24h on the seat-defining tube 12a.

As the air plane experiences a negative G force—that is an acceleration in the up direction of the plane when at normal attitude—the force of weight 28 on the diaphragm 14a decreases and ultimately increases in the direction to seat the diaphragm on valve 24b. This condition is shown in Figure 2 where the weight 28 has lifted the diaphragm 14a sufficiently to seat it against the valve 24b.

Figure 1:
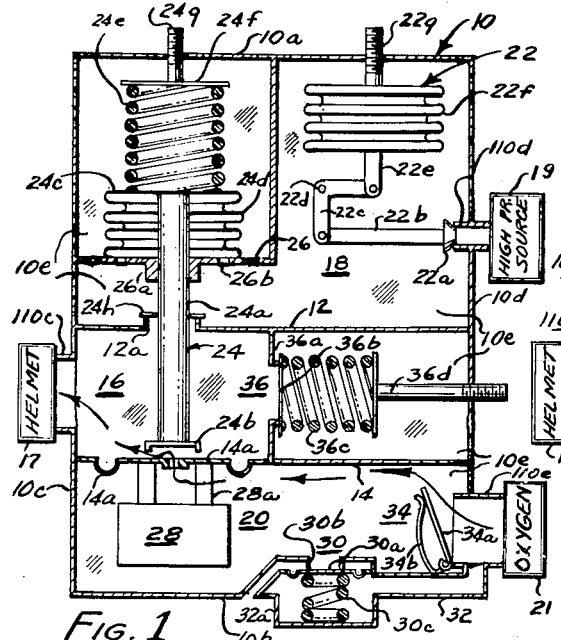
Figure 1 is a schematic diagram showing one form of the present invention during normal inspiration of air by the aviator.
Figure 2:
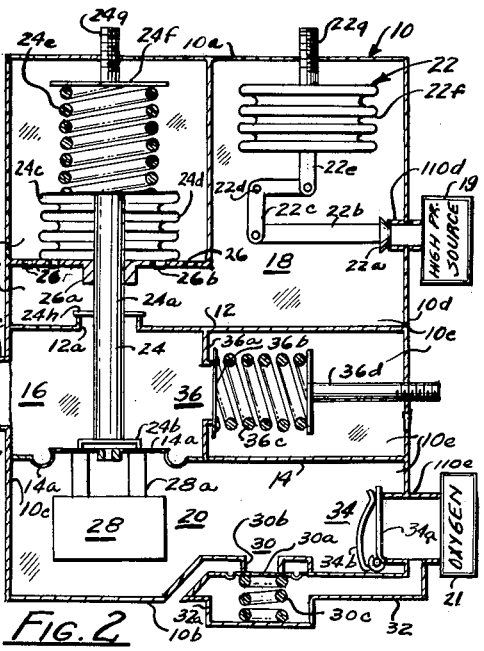
Figure 2 is a view similar to Figure 1 but showing the state of apparatus under limited negative G acceleration.

In the position of Figure 2, the communication between space 20 and space 16 is cut off. Thus the pressure in the chamber 16 can rise above the normal pressure. As hereafter described in detail, the balanced valve 30 normally prevents the pressure in the chamber 20 from exceeding the pressure in the pipe 110e from the oxygen source 21.

If the negative G acceleration further increases, the force of the weight 28 in direction to lift the valve stem 24a further increases. This force is ultimately sufficient to overcome the bias of the spring 24e and unseat the valve member 24h to admit air from chamber 18 into the chamber or space 16. This condition is shown in Figure 3.

Figure 3:
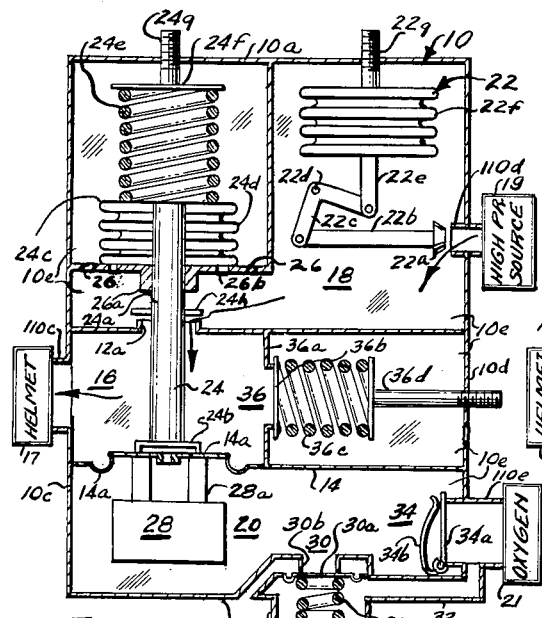
Figure 3 is a view similar to Figures 1 and 2 showing the apparatus during substantial negative G acceleration.

When the condition of Figure 3 exists, air from source 19 flows through the pipe 110d to the space 18 and through the valve seat defining tube 12a to the space 16. Thus the air pressure in the helmet 17 is increased. It will be noted that the increased pressure in the space 16 imparts a downward force on the diaphragm 14a in opposition to the upward force (as seen in the figures) on the weight 28. The weight accordingly descends as this diaphragm pressure is exerted, with the consequence that the valve 24h—12a tends to close. This regulating action controls the pressure in the space 16 to the value at which the pressure just balances the negative G force on the weight 28.

The valve 22a—110d acts as a pressure reducing regulating valve to reduce the comparatively high pressure of source 19 to a regulated lower value in space 18. The regulated lower value is of a value that can be effectively controlled by the valve 24h—12a.

Figure 4:
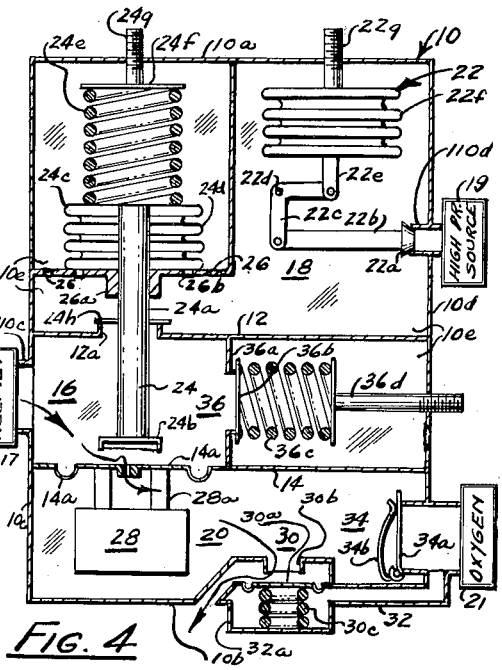
Figure 4 is a view like Figures 1–3 showing the apparatus after a substantial negative G acceleration has disappeared.

Figure 4 shows the action of the valve when a negative G acceleration is discontinued. In this case, the negative G (upward) force on the weight 28 is less than the counterforce exerted on diaphragm 14a by the air in chamber 16. The diaphragm 14a accordingly falls to a spaced position with respect to the valve member 24h, thus defining an air escape passage from the space 16 to the space 20.

Air discharge from the space 20 is permitted by the check valve 30. This valve consists of a diaphragm 30a which normally seats against the lip of the escape pipe 30b to seal the same. Diaphragm 30a is biased to the closed position by the spring 30c to hold the valve closed except when the pressure in the chamber 20 exceeds that of the oxygen source 21. Pipe 32 provides air communication between source 21 and the back side of the diaphragm 30a and forms a housing 32a behind the diaphragm 30a and in which the spring 30c rests.

When, as after a negative G acceleration is discontinued, the pressure in chamber 20 exceeds the pressure in source 21, the diaphragm 30a moves to a spaced position in relation to the pipe 30b and thereby defines an annular air escape passage through which the air from chamber 20 can escape, as shown by the arrows of Figure 4.

When the pressure in chamber 20 falls to approximately that of the source 21, the spring 30c pushes diaphragm 30a to the closed position and thereby seals chamber 20 so that breathing of the user recurrently opens and closes the check valve 34 to admit oxygen on inhalation. Valve 34 consists of a rockable valve member 34a which is biased towards the closed position by the spring 34b.

During normal breathing the balanced valve 30 also recurrently opens as the user exhales into the chambers 16 and 20.

Valve 36 limits the maximum pressure in space 16. This valve is defined by the apertured wall 36a which is closed by the valve 36b, which in turn is biased to closed position by the spring 36c. Spring 36c is adjustably held by the threaded stop to hold the valve closed unless a preset excess pressure value is reached.

Figures 5–8 show an actual valve unit embodying the features shown diagrammatically in Figures 1–4.

In the structure of Figures 5–8, the high pressure air source is connected to coupling 219. Air from this source passes into the space 218 and is admitted to that space at a lower controlled pressure by the regulating valve formed by the diaphragm 222f, which moves the pin 222e to operate linkage 222b and open or close valve 222a as required to maintain a regulated lower air pressure in the space 218. The value of this regulated pressure is determined by the adjustment of screw 222g which varies the effect of the biasing spring 222h and thus varies the force of the diaphragm 222f at any degree of collapse.

The air in space 218, Figure 8, is admitted to the space 218a, Figures 7 and 8, by the passage 218b, Figure 8. A similar passage (not shown) admits the air to the space 218c, Figure 7.

Space 218c communicates with the space 216, Figure 7, when there is a predetermined negative G acceleration which urges weight 228 in the up direction to lift valve stem 224 against the bias of the spring 224e. When the weight 228 thus lifts, the air travels through passage 216a to the coupling 217a to which the helmet is attached.

The oxygen supply is attached to the coupling 221, Figure 7. This coupling admits oxygen to the check valve 234, which has a movable valve member 234a, which is biased to the closed position by spring 234b. This valve opens when the pressure in chamber 221 exceeds the pressure in chamber 220. Chamber 220 is connected by a passage 220b, Figure 7, to the space 220a in which the weight 228 is located and which is closed at its top end by the diaphragm 214a which carries an annular seating member to engage the mating valve member 224b located at the bottom end of the stem 224. When the negative G acceleration is less than the predetermined amount required to lift the weight 228, the valve 214a–224b is open and the oxygen can pass from the coupling 221 to the coupling 217a in accord with the breathing of the user. When the negative G acceleration exceeds this threshold value, the valve 214a–224b closes to interrupt oxygen flow.

Air is discharged or dumped from spaces 220, 220a and 220b by the dump valve mechanism 230, Figure 5. This valve consists of a diaphragm 230a, which is normally held against the annular face 230b by the spring 230c. The space 232a is in communication with the interior of the coupling 221 by reason of a suitable passage (not shown) extending through the housing and at its ends opening into space 232a, on one hand, and the interior of the coupling 221, on the other hand. The space 230d, between the diaphragm 230a and the housing communicates with the exterior of the valve by reason of a passage (not shown) which at one end opens into the space 230d and at the other end opens into atmosphere.

The unit of Figures 5–8 also discharges regulated air at high pressure to the pressure pads on the suit worn by the user to prevent excess blood flow to the lower extremities upon positive G acceleration. This pressure is supplied through the coupling 238 which receives air from the high pressure source connected to coupling 219. The air path may be traced from coupling 219, Figure 7, to space 218 and space 218a. The air then passes to the coupling 238 when the weight 240 pushes downwardly with the force associated with a positive G acceleration.

Pressure built up in the pressure pads is relieved upon reduction in positive G acceleration by the escape path formed between stem 244 and the annular valve facing 246, the latter of which lifts when the positive G acceleration down force upon it is relieved. Passage 246a defines an air escape path (not shown) to the exterior of the unit.

The check valve 242, Figure 6, is in communication with the space 238a, Figures 6 and 7, and acts to discharge air from the interior of coupling 238 upon excess pressure buildup. This check valve is biased to the closed position by the spring 242a, which is capable of withstanding normal operating pressures but compresses to open the valve upon excessive pressure.

A similar check valve 236, shown in dotted lines in Figure 6, provides an excess pressure release for the space 216, Figure 7.

A structure having features in common with that above described is shown and claimed in the application of Charles P. Gabriel, Serial No. 228,427, filed May 26, 1951, entitled "Valve Structure" and assigned to the same assignee as the present invention.

While I have shown and described specific embodiments of the present invention, it will, of course, be understood that I do not wish to be limited thereto and that many modifications and alternative constructions may be made without departing from the spirit and scope thereof. I, therefore, intend by the appended claims to cover all such modifications and alternatives as fall within their true spirit and scope.

What I claim as new and desire to secure by Letters Patent of the United States is:

1. A valve control unit to control pressure in a helmet in response to acceleration, comprising in combination: a housing having a chamber in communication with the helmet, and a pair of auxiliary spaces communicating with the chamber through ports; means to supply air under predetermined pressure to one of said spaces; weight operated valve means operable to admit air from said one space to said chamber upon predetermined negative G acceleration; means to supply oxygen to the other of said spaces under pressure less than said predetermined pressure; weight operated valve means operable to close the port from said other space to said chamber upon predetermined negative G acceleration; a valve having a pair of opposed pressure-responsive faces, one in communication with said means to supply oxygen and the other in communication with said other space, the valve being operable to define a relief passage from said other space to the atmosphere when the pressure in said other space exceeds the pressure of said means to supply oxygen.

2. A valve control unit to control pressure in a helmet from a source of oxygen at predetermined pressure and from a source of air at predetermined greater pressure, comprising in combination: a housing having a first chamber communicating with said first source, a second chamber communicating with said second source, and a third chamber communicating with the helmet; weight actuated valve means defining a passage from the first chamber to the third chamber and operable to close upon predetermined negative G acceleration; weight actuated valve means operable to define a passage from the second chamber to the third chamber and operable to open upon predetermined negative G acceleration; and a balanced pressure valve having one pressure face communicating with said first source and a second opposed pressure face communicating with said first chamber, said balanced pressure valve being operable to define a discharge opening from the first chamber to the atmosphere when the pressure in the first chamber exceeds the pressure of the first source.

3. A valve control unit to control pressure in a helmet from a source of oxygen at predetermined pressure and from a source of air at predetermined greater pressure, comprising in combination: a housing having a first chamber communicating with said first source, a second chamber communicating with said second source, and a third chamber communicating with the helmet; weight actuated valve means defining a passage from the first chamber to the third chamber and operable to close upon predetermined negative G acceleration; weight actuated valve means operable to define a passage from the second chamber to the third chamber and operable to open upon predetermined negative G acceleration; a balanced pressure valve having one pressure face communicating with said first source and a second pressure face communicating with said first chamber, said balanced pressure valve being operable to define a discharge opening from the first chamber to the atmosphere when the pressure in the first chamber exceeds the pressure of the first source, and a check valve interposed between the first source and the first chamber to prevent reverse flow of air into the first source.

4. A valve control unit to control pressure in a helmet from a source of oxygen at predetermined pressure and from a source of air at predetermined greater pressure, comprising in combination: a housing having a first chamber communicating with said first source, a second chamber communicating with said second source, and a third chamber communicating with the helmet; weight actuated valve means defining a passage from the first chamber to the third chamber and operable to close upon predetermined negative G acceleration; weight actuated valve means operable to define a passage from the second chamber to the third chamber and operable to initiate opening movement upon a predetermined greater negative G acceleration and to open to increasing extents as the negative G acceleration increases; a pressure balance valve between said first chamber and the atmosphere, said valve having a first actuating face responsive to pressure in said first chamber and operable to open the valve as said pressure increases and a second actuating face responsive to pressure in said first source and operable to prevent opening of the valve unless the pressure in said first chamber exceeds the pressure in said first source.

5. A valve control unit to control pressure in a helmet from a source of oxygen at predetermined pressure and from a source of air at predetermined greater pressure, comprising in combination: a housing having a first chamber in communication with said first source, a second chamber in communication with said second source, a third chamber in communication with the helmet, and ports between the third chamber and the first two chambers, respectively; an apertured diaphragm extending across the port between the first chamber and the last chamber; a valve unit having a first face adapted to seat upon and close the port between the second chamber and the last chamber and a second face adapted to receive the diaphragm to close the aperture of the same; and a weight cooperatively associated with the diaphragm and operable upon increased acceleration first to lift the diaphragm against the second face of the valve and, upon further acceleration to move the valve to unseat the first face thereof and define a passage for communication between the second chamber and the third chamber.

6. A valve control unit to control pressure in a helmet from a source of oxygen at predetermined pressure and from a source of air at predetermined greater pressure, comprising in combination: a housing having a first chamber in communication with said first source, a second chamber in communication with said second source, a third chamber in communication with the helmet, and aligned ports between the third chamber and the first two chambers, respectively; an apertured diaphragm extending across the port between the first chamber and the last chamber; a valve unit having a stem extending from the port between the second chamber and the last chamber, a first face adapted to seat upon and close the port between the second chamber and the last chamber, and a second face adapted to receive the diaphragm to close the aperture of the same; a weight cooperatively associated with the diaphragm, and spring means opposing movement of the valve stem under the action of the weight, the faces of the valve unit being so spaced as to cause the diaphragm to seat on the last mentioned face upon predetermined acceleration and to lift the last face free of the port between the second chamber and the last chamber upon predetermined greater acceleration.

7. A valve control unit to control pressure in a helmet from a source of oxygen at predetermined pressure and from a source of air at predetermined greater pressure, comprising in combination: a pair of spaced generally parallel walls having apertures aligned in a direction perpendicular thereto; an apertured diaphragm extending across the aperture of one wall; a valve having a stem extending through the aperture in the other wall and having a first seating element adapted to seat against the aperture in the other wall to close the same and a second seating element adapted to seat against the diaphragm to close the aperture therein, the seating elements being spaced by less than the spacing of the walls; a weight in cooperative relation to the diaphragm and operable to flex the same towards the second seating elements in response to negative G acceleration, the diaphragm being capable when flexed in response to negative G acceleration of engaging the second seating elements and thereafter to lift the valve stem to disengage the first seating elements; and means to apply air from between the walls to the helmet, air from said source to the opposite side of the other wall, and oxygen from said source to the opposite side of the one wall, and means responsive to the pressure on said opposite side of said other wall and operative to lift the valve stem as the pressure increases.

No references cited.